(12) United States Patent
Wolf et al.

(10) Patent No.: US 11,479,222 B2
(45) Date of Patent: Oct. 25, 2022

(54) POLE WHEEL ON A VEHICLE WHEEL

(71) Applicant: WABCO GmbH, Hannover (DE)

(72) Inventors: Thomas Wolf, Barsinghausen (DE); Jürgen Dalisdas, Hannover (DE)

(73) Assignee: ZF CV SYSTEMS HANNOVER GMBH, Hannover (DE)

(*) Notice: Subject to any disclaimer, the term of this patent is extended or adjusted under 35 U.S.C. 154(b) by 495 days.

(21) Appl. No.: 16/497,258

(22) PCT Filed: Mar. 12, 2018

(86) PCT No.: PCT/EP2018/056049
§ 371 (c)(1),
(2) Date: Sep. 24, 2019

(87) PCT Pub. No.: WO2018/172116
PCT Pub. Date: Sep. 27, 2018

(65) Prior Publication Data
US 2020/0384968 A1 Dec. 10, 2020

(30) Foreign Application Priority Data

Mar. 24, 2017 (DE) .......................... 102017002869.9

(51) Int. Cl.
G01B 7/30 (2006.01)
G01P 3/481 (2006.01)
G01D 5/244 (2006.01)
B60T 8/32 (2006.01)
(Continued)

(52) U.S. Cl.
CPC ............. *B60T 8/329* (2013.01); *B60T 8/171* (2013.01); *F16D 66/00* (2013.01); *G01B 7/30* (2013.01); *G01D 5/244* (2013.01); *G01P 3/481* (2013.01); *B60T 2270/10* (2013.01); *F16D 2066/003* (2013.01)

(58) Field of Classification Search
CPC ............ G01B 7/30; G01P 3/481; G01D 5/244
See application file for complete search history.

(56) References Cited

U.S. PATENT DOCUMENTS

| 3,761,751 A | 9/1973 | Fink et al. |
| 6,492,805 B1 | 12/2002 | Wakabayashi et al. |
| 6,619,440 B2 | 9/2003 | Antony et al. |

(Continued)

FOREIGN PATENT DOCUMENTS

| DE | 2113307 A | 9/1972 |
| DE | 3215212 A1 | 11/1983 |

(Continued)

OTHER PUBLICATIONS

English translation of International Search Report for PCT/EP2018/056049 dated May 30, 2018, 2 pages.

(Continued)

*Primary Examiner* — Reena Aurora
(74) *Attorney, Agent, or Firm* — Warner Norcross + Judd LLP

(57) ABSTRACT

A pole wheel is provided. The pole wheel can be mounted on a brake disk of a vehicle wheel brake. The pole wheel has apertures which are uniformly distributed over its circumference and which are spaced apart from one another by radial webs. The pole wheel has an axially protruding bulge radially above its apertures and radial webs.

9 Claims, 2 Drawing Sheets

(51) Int. Cl.
    *B60T 8/171*          (2006.01)
    *F16D 66/00*         (2006.01)

(56) References Cited

U.S. PATENT DOCUMENTS

| | | | |
|---|---|---|---|
| 7,963,375 B2 | 6/2011 | Pahle | |
| 8,613,347 B2 | 12/2013 | Pahle | |
| 2007/0175715 A1* | 8/2007 | Pahle | G01P 3/488 |
| | | | 188/218 XL |
| 2013/0001029 A1* | 1/2013 | Visca | F16D 65/123 |
| | | | 188/234 |

FOREIGN PATENT DOCUMENTS

| | | |
|---|---|---|
| DE | 3802508 A1 | 8/1989 |
| DE | 30019054 T2 | 8/2005 |
| DE | 102008017360 B3 | 7/2009 |
| EP | 1088751 A2 | 4/2001 |
| EP | 1293699 A2 | 3/2003 |
| WO | 2006008044 A1 | 1/2006 |

OTHER PUBLICATIONS

Machine assisted English translation of DE3215212A1 obtained from https://worldwide.espacenet.com on Sep. 20, 2019, 6 pages.
Machine assisted English translation of DE3802508A1 obtained from https://patents.google.com on Sep. 20, 2019, 4 pages.

* cited by examiner

POLE WHEEL ON A VEHICLE WHEEL

CROSS-REFERENCE TO RELATED APPLICATIONS

This application is a national phase entry of PCT/EP2018/056049, filed on 12 Mar. 2018, which claims priority to and all advantages of German Patent Application No. 10 2017 002 869.9, filed on 24 Mar. 2017, the disclosures of which are incorporated herein by reference in their entirety.

FIELD OF THE DISCLOSURE

The present disclosure relates to a pole wheel. The pole wheel can be mounted on a brake disk of a vehicle wheel brake and has apertures which are uniformly distributed over its circumference and which are spaced apart from one another by radial webs.

BACKGROUND

A pole wheel is described in EP 1 293 699 A2. The pole wheel can be connected to a brake disk of a vehicle wheel. It has webs which space apart apertures in the pole wheel from one another. The webs and/or apertures of the pole wheel serve as pulse generators for a proximity sensor whose sensor signals are forwarded to a control device of an antilocking system, for example. The sensor information makes it possible to determine the angular position and/or the rotational speed of the brake disk and thus of the vehicle wheel. The particular configuration of pole wheel and brake disk described in this document is intended to allow advantageous fastening of the pole wheel to the brake disk and to avoid the risk of rust penetration.

Against this background, an object on which the present disclosure is based is to design a pole wheel, which serves for the same intended use, in such a way that a necessary air gap between a surface of the pole wheel that faces the sensor and a front end face of the sensor that faces the pole wheel maintains a predetermined size even if rust penetration and/or different material expansions occur during operation.

BRIEF SUMMARY

A pole wheel for mounting on a brake disk of a vehicle wheel brake is provided. The pole wheel has apertures which are uniformly distributed over its circumference and spaced apart from one another by radial webs. The pole wheel has an axially protruding bulge radially above the apertures and radial webs.

BRIEF DESCRIPTION OF THE DRAWINGS

The present disclosure is described in greater detail below with reference to the accompanying figures, in which.

DETAILED DESCRIPTION

Figure 1:
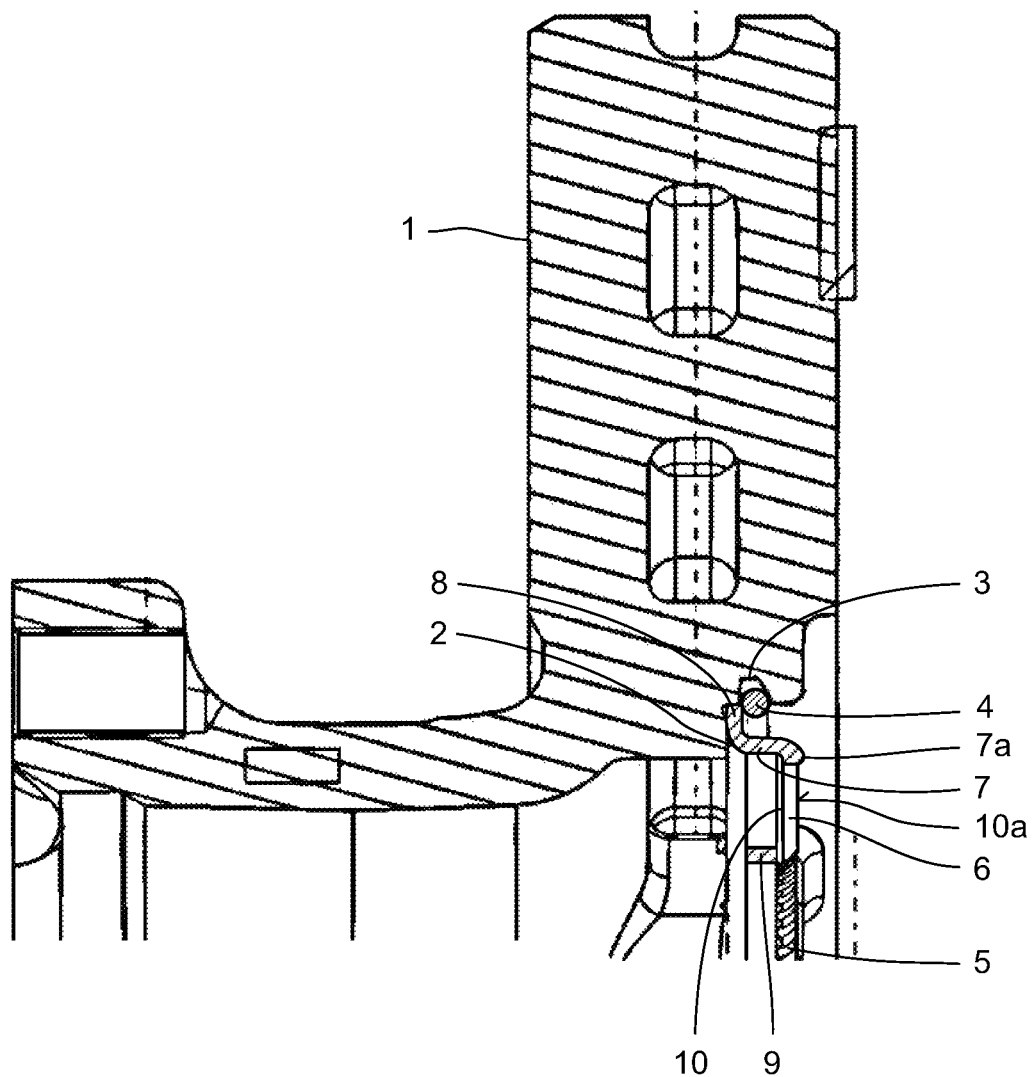
FIG. 1 shows a partial sectional view of a brake disk with a pole wheel arranged thereon.

With reference to the specific embodiment of the figures, wherein like numerals generally indicate like parts throughout the several views, a pole wheel is provided. The pole wheel can be mounted on a brake disk of a vehicle wheel brake. The pole wheel has apertures which are uniformly distributed over its circumference and which are spaced apart from one another by radial webs. The pole wheel has an axially protruding bulge radially above its apertures and radial webs.

A front end face of the rotational speed sensor can be placed on the axially protruding bulge. The axially protruding bulge extends only slightly axially in such a way that, by virtue thereof, an air gap of defined width is defined axially between the apertures and radial webs on the one hand and the front end face of the rotational speed sensor on the other hand.

The construction described allows a rotational speed sensor to be placed axially on the axially protruding bulge of the pole wheel, wherein the axial extent of the axially protruding bulge ensures that an air gap is maintained between the rotational speed sensor and the apertures and radial webs of the pole wheel with a predetermined axial width. This air gap between the pole wheel and the rotational speed sensor generally does not change even if the pole wheel is displaced because of rust penetration in its fastening region and/or as a result of different material expansions. The contact surface by which the rotational speed sensor bears against the axially protruding bulge can be very small, with the result that the friction losses there are negligible.

In various embodiments, the radial webs and/or the apertures are pulse generators, which follow one another in the circumferential direction of the pole wheel, for a rotational speed sensor which is to be arranged in a positionally fixed manner and axially with respect to the pole wheel.

Where mention is made here of a rotational speed sensor, it should be noted that it is generally a proximity sensor in which, with the pole wheel rotating, a moving-past web generates an electromagnetically induced pulse which is then forwarded to a control device connected to the sensor. The pulses of the proximity sensor emitted per unit time are then used by the control device to calculate for example the current angle of rotation position or the current rotational speed of the pole wheel or of the component connected to the pole wheel in a rotationally fixed manner, for instance the already mentioned brake disk of a motor vehicle.

In certain embodiments, the radially oriented webs of the pole wheel are connected in one piece to a radially outer axial flange and to a radially inner axial flange. The radially outer axial flange and/or the radially inner axial flange are connected in one piece to a radially bent-off radial flange which is intended to be fastened to a radial bearing surface of the brake disk.

To fasten the pole disk to such a brake disk, the radial bearing surface may be arranged in the brake disk in an axially recessed manner, and that, adjacent to the bearing surface, a radially inwardly open, circular groove is formed in the brake disk to receive a circlip which secures the pole wheel to the brake disk.

In various embodiments, for particularly simple manufacturability, it may be advantageous if the axially protruding bulge is formed, at the transition from the radially outer axial flange to the webs, as an integrally formed, peripheral projection, and the axial extent of this axially protruding bulge corresponds to the required width of the air gap between the surfaces of the webs that face the rotational speed sensor and the front end face of the rotational speed sensor.

In order to maintain, generally without effect, a slight axial movability of the pole wheel even with rust penetration and/or as a result of different material expansions, in certain embodiments the rotational speed sensor bears elastically against the axially protruding bulge formed as a peripheral projection.

In various embodiments, the pole wheel can be produced in a simple manner as a sheet-metal formed part with punched-out apertures. It is to be appreciated that the apertures may also be incorporated in some other way.

The described pole wheel, its arrangements and its interaction with a rotational speed sensor can be advantageous elements of an electronic monitoring system for the angular position and/or the rotational speed of a wheel during operation of a vehicle. In particular, the pole wheel, its arrangements and its interaction with a rotational speed sensor, can be useful in an antilocking system.

Referring to the drawings, FIG. 1 schematically shows in a partial longitudinal section a brake disk 1 of a vehicle, for example of a passenger motor vehicle, of a commercial vehicle or of a trailer vehicle. This brake disk 1 has, radially inward in the region of its right end face in FIG. 1, a circular-ring-shaped recess which is open axially on one side and on which a bearing surface 2 for a pole wheel 5 is formed. The pole wheel 5 arranged there comprises, consists essentially of, or consists of, a sheet-metal formed part with punched-out apertures 6 in the form of radial slots which are spaced apart from one another by radial webs 10. These radial webs 10 and/or the apertures 6 serve as pulse generators for a rotational speed sensor 11 illustrated in FIG. 2.

Figure 2:
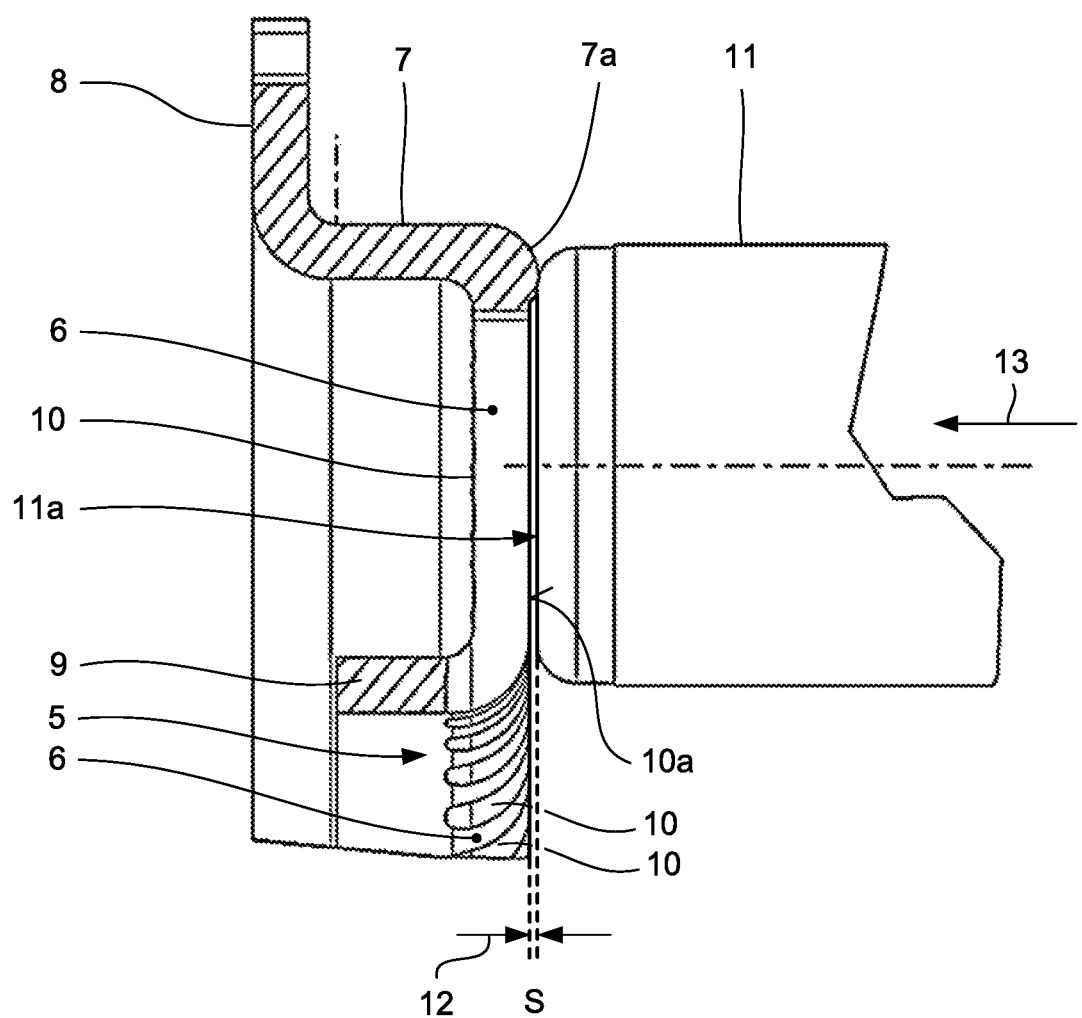
FIG. 2 shows an enlarged partial sectional view of a pole wheel with a rotational speed sensor arranged thereon.

As depicted particularly by the enlarged illustration according to FIG. 2, the pole wheel 5 has a radially outer axial flange 7, a bent-off outer radial flange 8 formed in one piece thereon, and a radially inner axial flange 9. The radial webs 10 are connected in one piece to the radially outer axial flange 7 and the radially inner axial flange 9 and in each case space apart from one another two adjacent apertures 6 which are formed as punched-out radial slots.

At the transition from the radially outer axial flange 7 to the apertures 6 and the radial webs 10 there is formed a circular-ring-shaped axially protruding bulge 7a which extends only very slightly axially in the direction of the rotational speed sensor 11. According to another embodiment, this axial protruding bulge 7a can also be constituted by a plurality of circle segments formed only in the region of the radially outer ends of the radial webs 10.

The rotational speed sensor 11 is received in an axially movable manner in a holder suitable for this purpose and is pressed elastically against the axial protruding bulge 7a of the pole wheel 5 by a spring force symbolized by an arrow 13. By virtue of the axially slight projection of the axial protruding bulge 7a beyond the sensor-side end face of the pole wheel 5 that is formed by the surfaces 10a of the radial webs 10, an air gap 12 is defined between the surfaces 10a of the radial webs 10 and a front end face 11a of the rotational speed sensor 11, the axial width S of the gap corresponding to the axial width of the axial protruding bulge 7a and being able to be set precisely during the production of the pole wheel 5.

It can be seen from FIG. 1 that the pole wheel 5 can be fastened by its outer radial flange 8 to the brake disk 1 in that, after the pole wheel 5 has been introduced onto the bearing surface 2 of the brake disk 1, a circlip 4 is inserted into a radially inwardly open groove 3 in the brake disk 1 that is formed adjacent to the bearing surface 2. Other ways of fastening the pole wheel 5 to the brake disk 1 are possible, for example by a corrugated ring inserted into the groove 3 or by screws, rivets or the like. Since sheet-metal formed parts can be produced in a highly precise manner without additional processing, a predeterminable air gap 12 can also be formed in large-series production with the necessary accuracy.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. An electronic monitoring system for the angular positon and/or the rotational speed of a wheel during operation of a vehicle, the monitoring system comprising:
  a rotational speed sensor and a pole wheel arranged axially across from the rotational speed sensor, the pole wheel being mountable on a brake disk of a vehicle wheel brake, wherein the pole wheel has apertures which are uniformly distributed over its circumference and spaced apart from one another by radial webs, wherein the pole wheel has an axially protruding bulge radially above the apertures and the radial webs, wherein a front end face of the rotational speed sensor is placed on the axially protruding bulge of the pole wheel, wherein the axially protruding bulge extends axially to define an air gap between the radial webs of the pole wheel and the front face of the rotational sensor.

2. The monitoring system according to claim 1, wherein the radial webs and/or the apertures are pulse generators, which follow one another in the circumferential direction of the pole wheel, for the rotational speed sensor which is arranged in a positionally fixed manner with respect to the pole wheel.

3. The monitoring system according to claim 2, wherein the rotational speed sensor bears elastically on the axially protruding bulge.

4. The monitoring system according to claim 1, wherein the radial webs are connected in one piece to a radially outer axial flange of the pole wheel and to a radially inner axial flange of the pole wheel, and wherein the radially outer axial flange and/or the radially inner axial flange are connected in one piece to a radially bent-off radial flange for fastening to a radial bearing surface of the brake disk.

5. The monitoring system according to claim 4, wherein the radial bearing surface is arranged in the brake disk in an axially recessed manner, and wherein adjacent to the radial bearing surface, a radially inwardly open, circular groove is formed in the brake disk for receiving a circlip which secures the pole wheel to the brake disk.

6. The monitoring system according to claim 4, wherein the axially protruding bulge is formed, at the transition from the radially outer axial flange to the radial webs, as an integrally formed, peripheral projection, and wherein the axial extent of the axially protruding bulge corresponds to the width of the air gap between i) surfaces of the radial webs that face the rotational speed sensor and ii) the front end face of the rotational speed sensor.

7. The monitoring system according to claim 1, wherein the pole wheel is produced as a sheet-metal formed part with punched-out apertures.

8. The monitoring system according to claim 1, further defined as an antilocking system.

9. The monitoring system according to claim 1, wherein the radial webs are connected in one piece to a radially outer axial flange and to a radially inner axial flange, and wherein the radially outer axial flange and/or the radially inner axial flange are connected in one piece to a radially bent-off radial flange for fastening to a radial bearing surface of the brake disk.

* * * * *